(12) United States Patent
Hoffmann et al.

(10) Patent No.: US 8,412,004 B2
(45) Date of Patent: Apr. 2, 2013

(54) DYNAMIC RESPONSE FORM SYMBOLOGY PROCESSING

(75) Inventors: Tristan E. Hoffmann, Exton, PA (US); Paul J. Holenstein, Downingtown, PA (US); Owen C. Davison, Honey Brook, PA (US); Victor F. Berutti, Glenmoore, PA (US); Bruce D. Holenstein, Media, PA (US)

(73) Assignee: Gravic, Inc., Malvern, PA (US)

( * ) Notice: Subject to any disclaimer, the term of this patent is extended or adjusted under 35 U.S.C. 154(b) by 189 days.

(21) Appl. No.: 12/905,187

(22) Filed: Oct. 15, 2010

(65) Prior Publication Data

US 2012/0093439 A1 Apr. 19, 2012

(51) Int. Cl.
*G06K 7/10* (2006.01)

(52) U.S. Cl. ........ 382/321; 382/113; 382/203; 358/474; 235/454

(58) Field of Classification Search .................. 435/353; 382/113; 235/454
See application file for complete search history.

(56) References Cited

U.S. PATENT DOCUMENTS

| | | | |
|---|---|---|---|
| 3,858,180 A | 12/1974 | Spanjersberg | |
| 4,937,439 A | 6/1990 | Wanninger et al. | |
| 4,989,258 A | 1/1991 | Takahashi et al. | |
| 5,102,341 A * | 4/1992 | Koslin | 434/353 |
| 5,134,669 A | 7/1992 | Keogh et al. | |
| 5,184,003 A | 2/1993 | McMillin et al. | |
| 5,235,655 A | 8/1993 | Hikawa | |
| 5,452,379 A | 9/1995 | Poor | |
| 5,550,930 A * | 8/1996 | Berman et al. | 382/187 |
| 5,711,673 A * | 1/1998 | Grundy, Jr. | 434/353 |
| 6,854,644 B1 | 2/2005 | Bolton et al. | |
| 7,077,313 B2 | 7/2006 | Chung et al. | |
| 7,555,145 B2 * | 6/2009 | Holenstein et al. | 382/113 |

FOREIGN PATENT DOCUMENTS

| | | |
|---|---|---|
| JP | 07013984 A | 1/1995 |
| JP | 04255088 B1 | 4/2009 |
| WO | 03010704 A1 | 2/2003 |

OTHER PUBLICATIONS

Baird, K. S., Anatomy of a Versatile Page Reader, Jul. 1992, Proceedings of the IEEE, vol. 80, pp. 1-7.*
Lee, Dar-Shyang, et al; Language Identification in Complex, Unoriented, and Degraded Document Images; 1992; World Scientific Publishing Co.; Document Analysis Systems II; Jonathan J. Hull (Ed.), S. L. Taylor (Ed.); pp. 1-23.*
Levin, Michael, CellWriter: Grid-Entry Handwriting Recognition, Dec. 2007 (see p. 16), http://risujin.org/cellwriter/cellwriter.pdf, pp. 1-16.*

* cited by examiner

*Primary Examiner* — Stephen R Koziol
*Assistant Examiner* — Darnell Bennett
(74) *Attorney, Agent, or Firm* — Panitch Schwarze Belisario & Nadel LLP

(57) ABSTRACT

A method is provided for using at least one response bubble on a response form to indicate one or more responses. The response form has a key definition area that includes one or more response bubbles corresponding to one or more intended responses, and a response area that includes one or more response bubbles for indicating intended responses. A response form is completed by defining an unambiguous symbology of one or more marks by completing the key definition area, and filling in the response area using the defined unambiguous symbology. The response form is then electronically imaged. The unambiguous symbology is then automatically interpreted from the key definition area of the response form. The indicated intended responses of the one or more response bubbles of the completed response form are automatically interpreted using the interpreted unambiguous symbology, and the electronically imaged completed response form.

9 Claims, 13 Drawing Sheets

Sample OMR Form
(PRIOR ART)

Sample Multi-level OMR Unambiguous Symbologies
(PRIOR ART)

a. Strongly Disagree to Strongly Agree Symbology strongly disagree, no opinion    disagree,    neutral,    agree,    strongly agree, b. Filled, Ignore, Unfilled Symbology

| Filled | Ignore | Unfilled |
|--------|--------|----------|
| ● | ✗ | ○ | c. Present, Tardy, Sick, Absent Symbology

| Present | Tardy | Sick | Absent |
|---------|-------|------|--------|
| ● | ⊕ | ⊜ | ⦀ |

Color Key:
● Green
⊕ Yellow
⊜ Blue
⦀ Red

Sample Batch Form Header and Exam Form
(PRIOR ART)
Batch Form Header

Remark University
Teacher and Class Information Sheet

Figure 3b. - Exam Form (PRIOR ART)

Attendance Form Using Dynamic Response Form Symbology (Color)

Figure 5
Sample Quiz Using Pre-printed Key Definition Area

History 102 Midterm Exam Answer Sheet

*Please follow the directions on the exam question sheet. Fill in the entire response bubble that corresponds to your answer for each question on the exam. If you made a mistake and wish for a filled in response bubble to be ignored, place an "X" through the response bubble:*

Answer Selection:   Correct: ●    Ignore: ✗

Teacher ID: 

Student ID:

|  | 0 | 1 | 2 | 3 | 4 | 5 | 6 | 7 | 8 | 9 |
|---|---|---|---|---|---|---|---|---|---|---|
| ___ | O | O | O | O | O | O | O | O | O | O |
| ___ | O | O | O | O | O | O | O | O | O | O |
| ___ | O | O | O | O | O | O | O | O | O | O |
| ___ | O | O | O | O | O | O | O | O | O | O |

1  Ⓐ Ⓑ Ⓒ Ⓓ Ⓔ    11 Ⓐ Ⓑ Ⓒ Ⓓ Ⓔ    21 Ⓐ Ⓑ Ⓒ Ⓓ Ⓔ
2  Ⓐ Ⓑ Ⓒ Ⓓ Ⓔ    12 Ⓐ Ⓑ Ⓒ Ⓓ Ⓔ    22 Ⓐ Ⓑ Ⓒ Ⓓ Ⓔ
3  Ⓐ Ⓑ Ⓒ Ⓓ Ⓔ    13 Ⓐ Ⓑ Ⓒ Ⓓ Ⓔ    23 Ⓐ Ⓑ Ⓒ Ⓓ Ⓔ
4  Ⓐ Ⓑ Ⓒ Ⓓ Ⓔ    14 Ⓐ Ⓑ Ⓒ Ⓓ Ⓔ    24 Ⓐ Ⓑ Ⓒ Ⓓ Ⓔ
5  Ⓐ Ⓑ Ⓒ Ⓓ Ⓔ    15 Ⓐ Ⓑ Ⓒ Ⓓ Ⓔ    25 Ⓐ Ⓑ Ⓒ Ⓓ Ⓔ
6  Ⓐ Ⓑ Ⓒ Ⓓ Ⓔ    16 Ⓐ Ⓑ Ⓒ Ⓓ Ⓔ    26 Ⓐ Ⓑ Ⓒ Ⓓ Ⓔ
7  Ⓐ Ⓑ Ⓒ Ⓓ Ⓔ    17 Ⓐ Ⓑ Ⓒ Ⓓ Ⓔ    27 Ⓐ Ⓑ Ⓒ Ⓓ Ⓔ
8  Ⓐ Ⓑ Ⓒ Ⓓ Ⓔ    18 Ⓐ Ⓑ Ⓒ Ⓓ Ⓔ    28 Ⓐ Ⓑ Ⓒ Ⓓ Ⓔ
9  Ⓐ Ⓑ Ⓒ Ⓓ Ⓔ    19 Ⓐ Ⓑ Ⓒ Ⓓ Ⓔ    29 Ⓐ Ⓑ Ⓒ Ⓓ Ⓔ
10 Ⓐ Ⓑ Ⓒ Ⓓ Ⓔ    20 Ⓐ Ⓑ Ⓒ Ⓓ Ⓔ    30 Ⓐ Ⓑ Ⓒ Ⓓ Ⓔ

31 Ⓐ Ⓑ Ⓒ Ⓓ Ⓔ    41 Ⓐ Ⓑ Ⓒ Ⓓ Ⓔ
32 Ⓐ Ⓑ Ⓒ Ⓓ Ⓔ    42 Ⓐ Ⓑ Ⓒ Ⓓ Ⓔ
33 Ⓐ Ⓑ Ⓒ Ⓓ Ⓔ    43 Ⓐ Ⓑ Ⓒ Ⓓ Ⓔ
34 Ⓐ Ⓑ Ⓒ Ⓓ Ⓔ    44 Ⓐ Ⓑ Ⓒ Ⓓ Ⓔ
35 Ⓐ Ⓑ Ⓒ Ⓓ Ⓔ    45 Ⓐ Ⓑ Ⓒ Ⓓ Ⓔ
36 Ⓐ Ⓑ Ⓒ Ⓓ Ⓔ    46 Ⓐ Ⓑ Ⓒ Ⓓ Ⓔ
37 Ⓐ Ⓑ Ⓒ Ⓓ Ⓔ    47 Ⓐ Ⓑ Ⓒ Ⓓ Ⓔ
38 Ⓐ Ⓑ Ⓒ Ⓓ Ⓔ    48 Ⓐ Ⓑ Ⓒ Ⓓ Ⓔ
39 Ⓐ Ⓑ Ⓒ Ⓓ Ⓔ    49 Ⓐ Ⓑ Ⓒ Ⓓ Ⓔ
40 Ⓐ Ⓑ Ⓒ Ⓓ Ⓔ    50 Ⓐ Ⓑ Ⓒ Ⓓ Ⓔ

Figure 6a
Sample Batch Header Containing a Key Definition Area and Form
Batch Header Containing a Key Definition Area

Daycare Daily Report Key Header

NOTE: Fill in the Key with the colors you plan to use.

| Key | Mood | Meals | Nap | Learning Time | Play time | Outside |
|-----|------|-------|-----|---------------|-----------|---------|
| ○ | Happy | Ate all | Slept full hr | Participated | Active | Active |
| ○ | Okay | Most | Half hr | Reserved | Inactive | Inactive |
| ○ | Sad | Refused | Just rested | Misbehaved | Misbehaved | Misbehaved |
| ○ | Angry | Spilled | None | Time Out | Time Out | Time Out |

Figure 6b. – Form

Daycare Daily Report

Name: _____  Date: ___/___/___

| Hour | Mood | Meals | Nap | Learning Time | Play time | Outside |
|------|------|-------|-----|---------------|-----------|---------|
| 6am  | ○ | ○ | ○ | ○ | ○ | ○ |
| 7am  | ○ | ○ | ○ | ○ | ○ | ○ |
| 8am  | ○ | ○ | ○ | ○ | ○ | ○ |
| 9am  | ○ | ○ | ○ | ○ | ○ | ○ |
| 10am | ○ | ○ | ○ | ○ | ○ | ○ |
| 11am | ○ | ○ | ○ | ○ | ○ | ○ |
| 12pm | ○ | ○ | ○ | ○ | ○ | ○ |
| 1pm  | ○ | ○ | ○ | ○ | ○ | ○ |
| 2pm  | ○ | ○ | ○ | ○ | ○ | ○ |
| 3pm  | ○ | ○ | ○ | ○ | ○ | ○ |
| 4pm  | ○ | ○ | ○ | ○ | ○ | ○ |
| 5pm  | ○ | ○ | ○ | ○ | ○ | ○ |
| 6pm  | ○ | ○ | ○ | ○ | ○ | ○ |

Comments

Dynamic Response Form Symbology Processing Using a Key Definition Area That Was Completed as Part of Form Completion Dynamic Response Form Symbology Processing Using a Key Definition Area That Was Completed Independent of Response Form Completion

Dynamic Response Form Symbology Processing Using a Key Definition Area on a Batch Header

Dynamic Response Form Symbology Processing Without a Key Definition Area

DYNAMIC RESPONSE FORM SYMBOLOGY PROCESSING

BACKGROUND OF THE INVENTION

Today, plain-paper Optical Mark Recognition (OMR) technology uses pattern recognition to automatically find response bubbles to determine the intended responses. Traditionally, response bubbles only had two intended responses—filled and unfilled. Response bubble attributes of the filled and unfilled bubbles would be compared, and a fill status would be determined with the corresponding response assigned to that bubble. Prior art FIG. 1 shows an example of a plain-paper OMR form. One limit to this technology is that it only allowed for the two possible outcomes.

This deficiency was addressed in U.S. Pat. No. 7,555,145 (Holenstein et al.) which provides multi-level OMR. Multi-level OMR allows an unambiguous symbology of marks to be defined for filling into each bubble that will allow a plurality of non-empty intended responses. The completed response forms are electronically imaged and processed using a scanning system. The forms can be imaged in a number of ways, such as by scanning or taking an image with a digital camera. The software itself may operate on many different types of systems, including on a desktop computer, built into a peripheral like a multi-functional device, or on a mobile smartphone. Once the form is electronically imaged and sent to the scanning system, the scanning system interprets the response bubble attributes of the filled in response bubble to associate a raw score with the response bubble that corresponds with one of the marks defined in the unambiguous symbology of marks. This allows respondents to have multiple ways to respond to each response bubble, allowing more information to be gathered in smaller spaces on the response forms. Examples of the response bubble attributes that can be used include color, density, shape, fill value, and line orientation. Part a. of prior art FIG. 2, part a. shows a symbology in which an entire scale from "strongly disagree" to "strongly agree" can be interpreted based upon the orientation and fill value of a mark. Part b. of FIG. 2 shows a symbology where an "ignore" state can be determined based upon the shape and density of the mark. Part c. of FIG. 2 shows a symbology where "present", "tardy", "sick" and "absent" can be determined based on the color of the mark.

One of the biggest challenges facing any OMR technology is that respondents rarely make their marks in the same way. Some may not fill the response bubble completely, or some might even fill in a response bubble with a line or checkmark or some other kind of mark. Multi-level OMR solves these issues to an extent, but even with the pre-defined unambiguous symbology of marks, respondents still will vary in how they reproduce the mark symbols or may wish to define their own symbologies.

Additionally, when processing a form that uses multi-level OMR, the scanning system needs to have the unambiguous symbology of marks defined before processing the form. This means that in order to process a batch of forms using multi-level OMR, all of the forms must adhere to the same unambiguous symbology of marks, and if a form uses a different unambiguous symbology of marks, then it has to be processed in a later batch with that unambiguous symbology defined.

Technology exists to process a batch header and prepend the information to each form in a batch of completed response forms being processed after the header. Prior art FIG. 3a shows a sample batch header to be used with a sample exam form in FIG. 3b. The batch header is first completed with information about the class code, instructor, and the like. The students then complete the exam form. When the forms are being processed, the batch header is processed first followed by the completed exams. The data from the batch header is then prepended to the data from each completed exam form in the batch. However, this prior art technique does not include a way in which the unambiguous symbology for the batch can be defined on the batch header.

What is needed is a method where the unambiguous symbology of marks can be interpreted during the processing of the form instead of needing to be defined beforehand. This would allow forms using different unambiguous symbologies of marks to be processed in the same batch, and at the same time allow respondents to define their own unambiguous symbology when filling out response forms.

BRIEF SUMMARY OF THE INVENTION

In one preferred embodiment of the present invention, there are two different sections of a response form: the key definition area and the response area. The key definition area contains one or more response bubbles, each associated with an intended response to be used while completing the response area. The response area contains the response bubbles corresponding to the questions and information to which the respondents are responding. When completing the response form, the respondent fills out both sections. The respondent fills out the key definition area with different distinct mark symbols, which could include different shapes, different areas being shaded, different colors, different levels of darkness, or a combination of any of these attributes. By filling out the response bubbles in the key definition area with different marks, the respondent is defining which mark symbol they will use for each intended response choice. Then, when filling out the response area, the respondent uses the same mark symbols to answer the response questions with the appropriate intended response. Upon form processing, the scanning system would first process the key definition area, interpreting the pixels of the marks to associate a raw score with each intended response to build the unambiguous symobology of marks. Then the system would process the response area, calculating a raw score for each response bubble and associating it with the unambiguous symbology of marks to assign an intended response for each of the response bubbles in the response area.

The form in FIG. 4 illustrates this concept using a sample attendance form. In the attendance form, there is a key definition area to define the mark symbols associated with each intended response. For example, the mark symbols used to fill out the first response bubble in the key definition area is associated with the "Present" response in the attendance column, the "A" response in the homework and quiz columns, and the "Active" response in the class participation area. In this form, the respondent associated a green mark as the "Present" response, a yellow mark for the "Tardy" response, a blue mark for the "Sick" response and a red mark for the "Absent" response. The respondent then filled out the response area for each student using this symbology. Upon form processing, the software uses the attributes of each mark symbol, like the color, to associate a score with each intended response, which is then used to compare the raw scores of the response bubbles in the response area with the associated raw scores for each intended response to assign an intended response to each of the response bubbles in the response area.

In another preferred embodiment of the present invention, the key definition area does not have to be completed by the respondent. Instead, the key can be defined while the form is being made and printed or copied electronically along with the unfilled response area. Alternatively, the key could also be filled in by a form administrator after the form was printed but either before or after the respondent completes the response area. In this embodiment, the respondent only has to complete the response area of the form using the pre-defined mark symbols in the key definition area in order to complete the form. On form processing, the same process is used. First the key response area is recognized and a raw score is associated with each intended response to build the unambiguous symbology, and then the unambiguous symbology is used to interpret the responses in the response area. By still interpreting the key response area, different unambiguous symbologies can be used to administer the form to different groups and still all be processed using the same form and in the same batch.

An example of this is illustrated in the form in FIG. 5. The form is a normal OMR test form, with 50 questions, each with response bubbles for choices A through E. At the top of the form, there are instructions given on how to fill out the response bubbles, instructing respondents to fill the response bubble in completely to select an answer, and to put an "X" through a completely filled response bubble to indicate that the bubble was marked by mistake and to ignore it. When processing the form, the key area will first be processed to determine the unambiguous symbology of marks representing the intended responses of response bubbles that have been filled in: filled and ignore. These two responses, along with the unfilled intended response represented by an unfilled response bubble, comprise the form's unambiguous symbology of marks. In this example, the response bubbles completely filled in will be considered filled, and any response bubble with an "X" through it will be considered a mistake and thus ignored. All other response bubbles will be considered unfilled.

In an extension of this embodiment, the key response area could be on a batch header and used for an entire batch of completed response forms. FIG. 6a shows an example of a batch header with a key definition area to be used with a sample daycare form in FIG. 6b. The daycare attendant completing the daily evaluation of the children would first use the batch header form to fill in the response bubbles in the key definition area with a symbology to be used when completing the daily daycare form. Then, each time they fill out a daycare evaluation form that day, they use that symbology defined in the batch header for each form. When the batch is being processed, the unambiguous symbology defined in the batch header will be used to process each of the completed daycare forms. If the daycare attendant wants to use a different symbology for another batch of forms, they would fill out another batch header to go with that batch.

One alternative embodiment of the invention does not use a key definition area at all. Instead, when processing the response form, the software compares all of the mark symbols used to fill out the response area of the form, and if a distinct unambiguous symbology can be inferred from these symbols, then it will be used to process the form. One preferred embodiment of this method would be to use a response bubble density discrimination algorithm to see if there are three distinct levels of fill—one that is unfilled, one that is completely filled and one that was only partially filled or possibly erased. This would allow the software to determine which responses were originally filled and then changed, much like the "ignore" option mentioned in the form in the previous example. By tracking this third option, reports could then be run to determine how often certain answer selections were selected and then erased. These reports could give the form administrator a sense of how confusing each question is.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

Figure 3B:
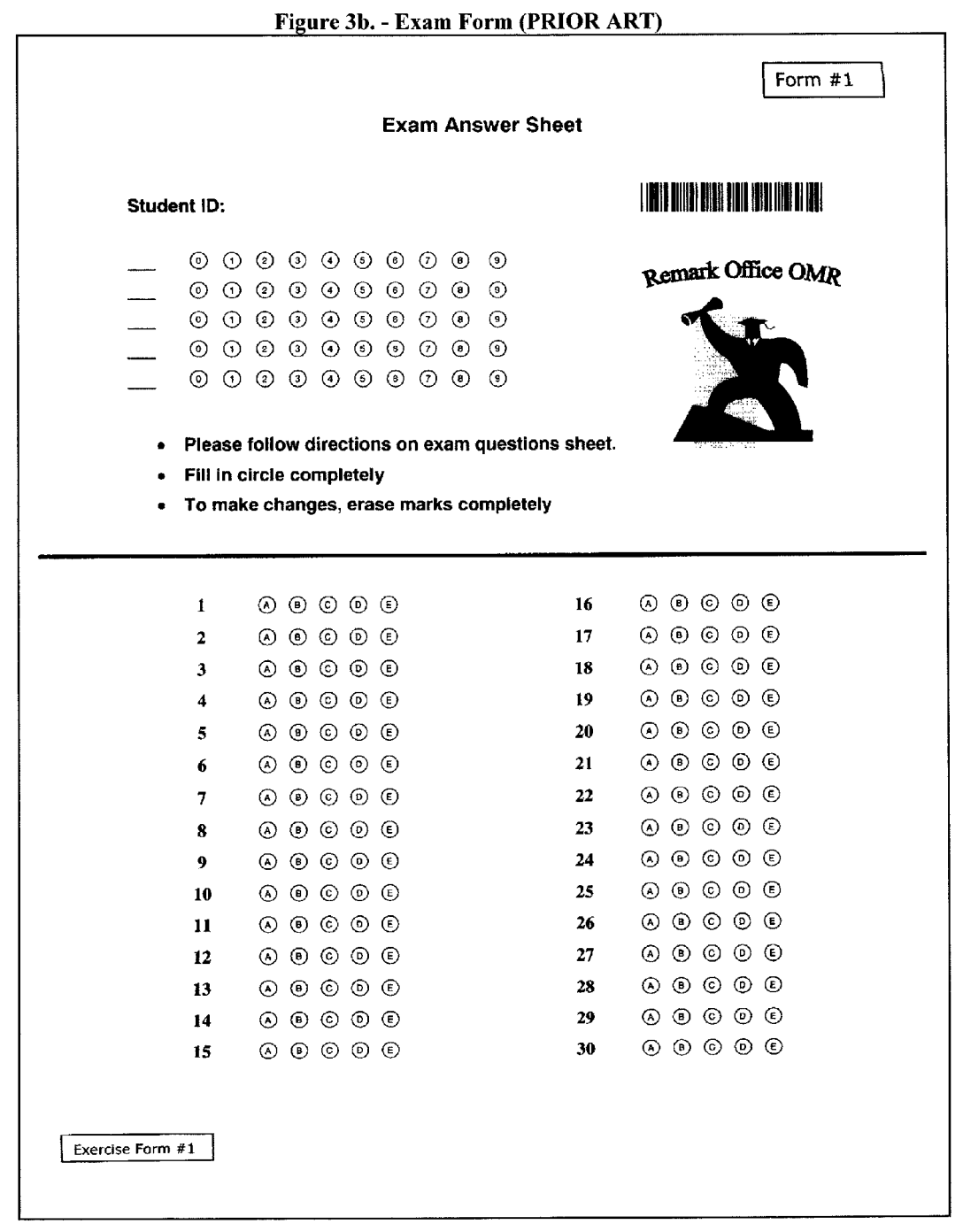

FIGS. 3a and 3b show a prior art OMR exam form using a batch header. The first form is a blank batch header that is to be completed and processed before every batch of completed response forms. The second form is a blank version of the exam form to be completed and processed as part of the batch.

FIG. 5 shows an exam form where the key definition area was completed before printing of the form, in accordance with one preferred embodiment of the present invention.

FIGS. 6a and 6b each show a batch header containing the key definition area and sample form to be used with it, in accordance with one preferred embodiment of the present invention. The first form is the batch header containing the key definition area to be completed and processed before every batch of completed response forms. The second form is the sample response form to be completed and processed as part of the batch.

DETAILED DESCRIPTION OF THE INVENTION

Figure 1:
FIG. 1 shows a sample prior art OMR exam form.
Figure 2:
FIG. 2 shows a prior art sample of multi-level OMR unambiguous symbologies. In the Present, Tardy, Sick, Absent Symbology, colors are represented by the color key given in the figure. Completely filled response bubbles represent bubbles filled with a green color; response bubbles filled with a plus symbol represent response bubbles filled with a yellow color; response bubbles with horizontal lines represent response bubbles filled with a blue color; and response bubbles with vertical lines represent response bubbles filled with a red color.
Figure 3A:
Figure 4:
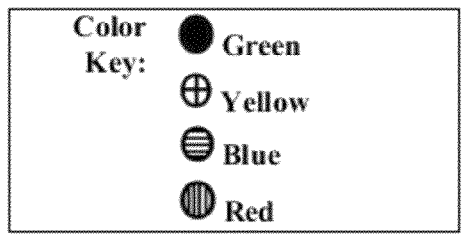
FIG. 4 shows an attendance form using a key definition area filled out by the respondent, in accordance with one preferred embodiment of the present invention. In this black and white image, colors are represented by the color key given in the figure. Completely filled response bubbles represent bubbles filled with a green color; response bubbles filled with a plus symbol represent response bubbles filled with a yellow color; response bubbles with horizontal lines represent response bubbles filled with a blue color; and response bubbles with vertical lines represent response bubbles filled with a red color.

Certain terminology is used herein for convenience only and is not to be taken as a limitation on the present invention.

DEFINITIONS

Unambiguous Symbology of Marks—A distinct set of one or more unambiguous marks used by the respondent when filling out a response form to correspond with each possible response to a response bubble.

Intended Response—The response value in the unambiguous symbology of marks that corresponds to the mark made by the respondent for a given response bubble.

Key Definition Area—A set of one or more response bubbles where each response bubble is associated with at least one intended response to be used to define the unambiguous symbology of marks.

Response Area—A set of one or more response bubbles associated with questions and responses for the respondent to answer.

I. Overview

In one preferred embodiment of the present invention, while completing the form, the respondent fills in both the key definition area to define the unambiguous symbology of marks being used and the response area using the defined unambiguous symbology of marks. When the form is processed, the key definition area is interpreted first, associating each mark symbol with an intended response. The response bubbles in the response area are then interpreted using the unambiguous symbology of marks.

In another preferred embodiment of the present invention, the key definition area is completed before or after the respondent has to complete the form. It could be pre-printed or assigned by the form administrator. The respondent then fills out the response area of the form using the given unambiguous symbology. Upon form processing, the key definition is still processed first to interpret the unambiguous symbology, and then the response area is interpreted using the defined unambiguous symbology.

In an extension of this embodiment, the key definition area can be contained on a separate batch header form and used for an entire batch of completed response forms. The batch header is processed first, and the unambiguous symbology is interpreted. Then the response area on all of the completed response forms in the batch are interpreted using the defined unambiguous symbology defined in the batch header.

An alternative embodiment does not use a key definition area, and instead the respondent would complete the response area of the response form just like any other OMR form. Upon processing, the unambiguous symbology would be inferred from the completed response bubbles and then used to interpret the completed response area.

II. Detailed Disclosure

In order to dynamically process response form symbologies, the symbology has to be defined for each form being processed. This can be achieved in different ways. One method is to designate a key definition area on the form where the unambiguous symbology will be explicitly filled out, either by the respondent during form completion or before or after the respondent receives the form. The key response area can also be contained on a batch header, and the corresponding unambiguous symbology can be used to process an entire batch of one or more completed response forms. Another method would be to use the completed response bubbles from the response area in a mark discrimination algorithm to determine different types of marks from the responses and infer an unambiguous symbology.

When building an unambiguous symbology, the same requirements are needed as those with multi-level OMR. There needs to be enough different symbols that match the need for the particular response, and each symbol should not be ambiguous, meaning that the characteristics used to interpret the mark need to be distinct from the other symbols in the symbology. A number of characteristics could be used to determine the symbology, such as shapes, density, contiguous pels, size of mark, and color values of mark.

Figure 7:
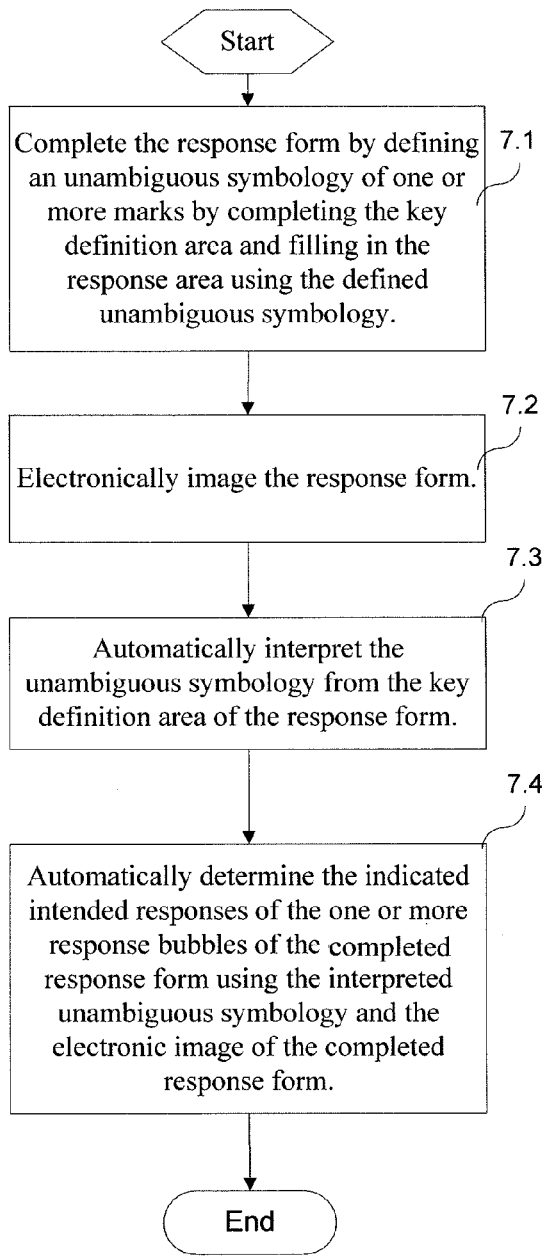
FIG. 7 shows the process of dynamically processing response form symbologies by determining the unambiguous symbology using a key definition area completed by the respondent as part of the form completion, in accordance with one preferred embodiment of the present invention.

In a preferred embodiment of this process as described in steps 7.1 through 7.4 of FIG. 7, the respondent completes the response form by filling out both the key definition area and the response area of the response form. When creating the response form, a distinct area on the form is designated as the key definition area, and each response bubble of the area is associated with a different intended response. When setting up the form template information in the software, the key definition area is defined, and each response bubble is set to be associated with the intended response option. The respondent then completes the blank response form by filling out both the key definition area and the response area. When processing the response form, the response form is electronically imaged and the image data analysis software processes the key definition area first. It uses one of the possible multi-level OMR recognition algorithms to define the mark associated with each intended response. If each of the marks is not ambiguous, the unambiguous symbology of marks is defined using these marks. The response bubbles in the response area are then processed, and a multi-level OMR recognition algorithm is used to compare the response bubble being processed with the defined unambiguous symbology to determine the indicated intended response.

Figure 8:
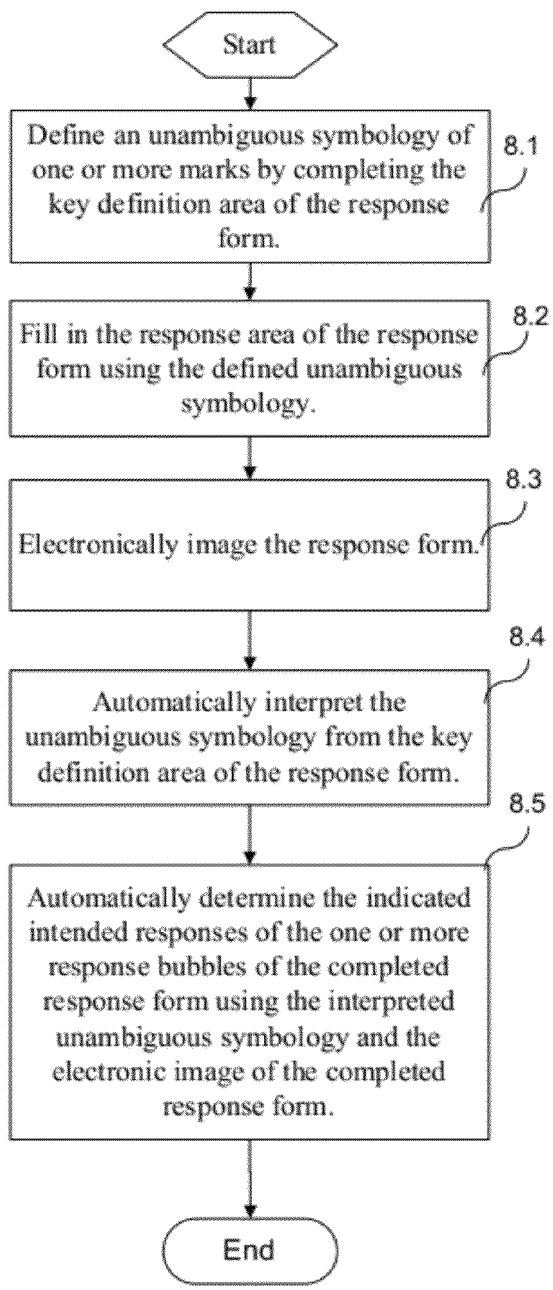
FIG. 8 shows the process of dynamically processing response form symbologies by using a key definition area completed independent of the response area completion, in accordance with one preferred embodiment of the present invention.

An alternative to the preferred embodiment is described in steps 8.1 through 8.5 of FIG. 8. In this embodiment, the key definition area is completed by someone other than the respondent. The rest of the process is exactly the same: both a key definition area and response area are created on the response form and set up when defining the form template information. However, the unambiguous symbology is then given to the respondent instead of having them fill it out. This could be done in a number of methods. For example, the unambiguous symbology could be defined prior to printing or copying the blank form to give to the respondent, or the form administrator could define the unambiguous symbology before administering the form to respondents. The processing is then done the same way as the above embodiment, where the response form is electronically imaged and the response bubbles in the key definition area are first interpreted to define the unambiguous symbology of marks, and then the intended responses of the response bubbles in the response area are determined using the unambiguous symbology.

Figure 9:
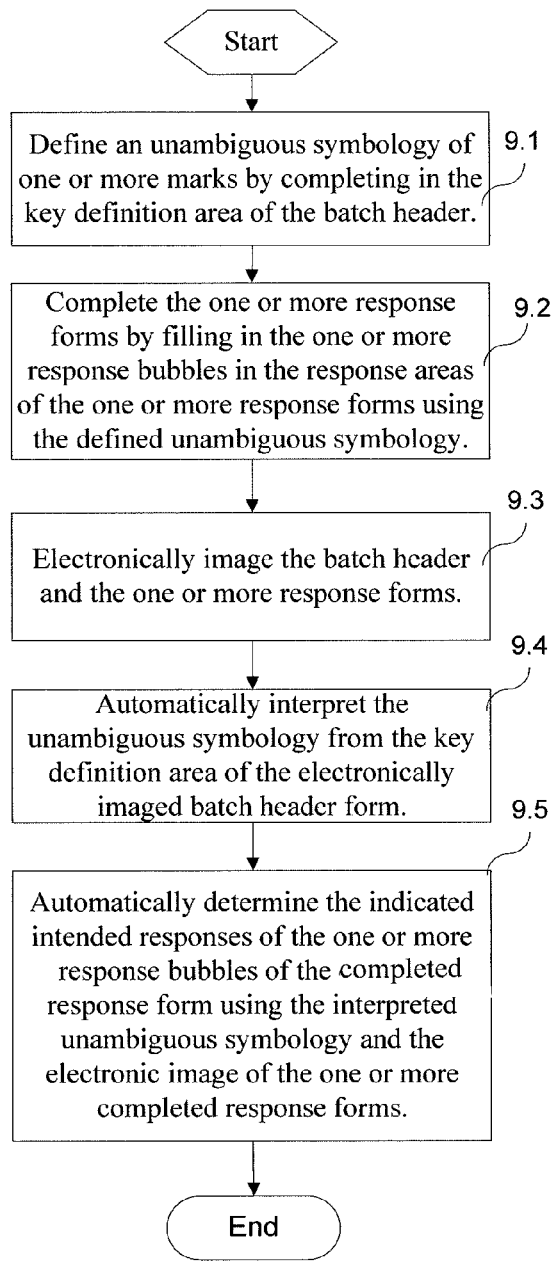
FIG. 9 shows the process of dynamically processing response form symbologies by using a key definition area on a batch header, in accordance with one preferred embodiment of the present invention.

One extension of this embodiment is described in steps 9.1 through 9.5 of FIG. 9. Since a batch of forms may share an unambiguous symbology of marks, the forms may also share the same key definition area. In other words, if an administrator were administering the response form to a group of respondents using the same defined unambiguous symbology of marks, then the key response area could be a batch header used to process all of the response forms, and the individual response forms would not need a key definition area on them. When processing the forms, the batch header would be processed first and the unambiguous symbology of marks would be determined from the key response area on the batch header. That unambiguous symbology of marks would then be used to process the response areas on all of the following response forms until the next batch header with a different unambiguous symbology is processed or form processing is completed.

Figure 10:
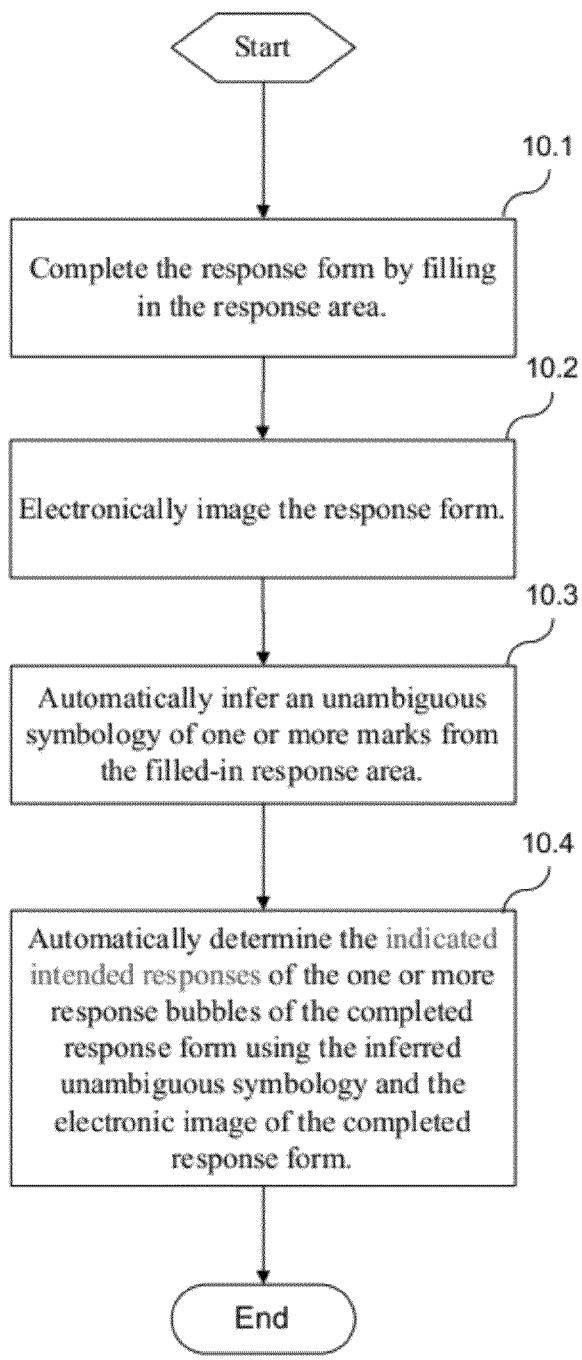
FIG. 10 shows the process of dynamically processing response form symbologies by inferring the unambiguous symbology without using a key definition area, in accordance with one preferred embodiment of the present invention.

In an alternative embodiment of the invention described in steps 10.1 to 10.4 of FIG. 10, a key definition area is not used at all, and the unambiguous symbology of marks is inferred from the responses to the response bubbles in the response area. A preferred embodiment of this process would be to infer which responses had been erased. When creating the form, only a response area is created. When setting up the form template information, the possible intended responses would be defined. The respondent would then complete the form by responding to the response bubbles in the response area. Upon processing, before the completed response area is processed, the response form would be electronically imaged and an unambiguous symbology would be inferred from the marks used to complete the response area. This could be done using a mark discrimination algorithm. For example, in the case of trying to record erased responses, the density of each response bubble could be determined. Then, if there are three distinct average levels of density, the thresholds to determine which mark would be associated with each intended response (unfilled, erased and filled) could be set using the average levels. Once the unambiguous symbology is inferred, it can then be used to process the response bubbles in the response area to determine the intended responses.

Figure 11:
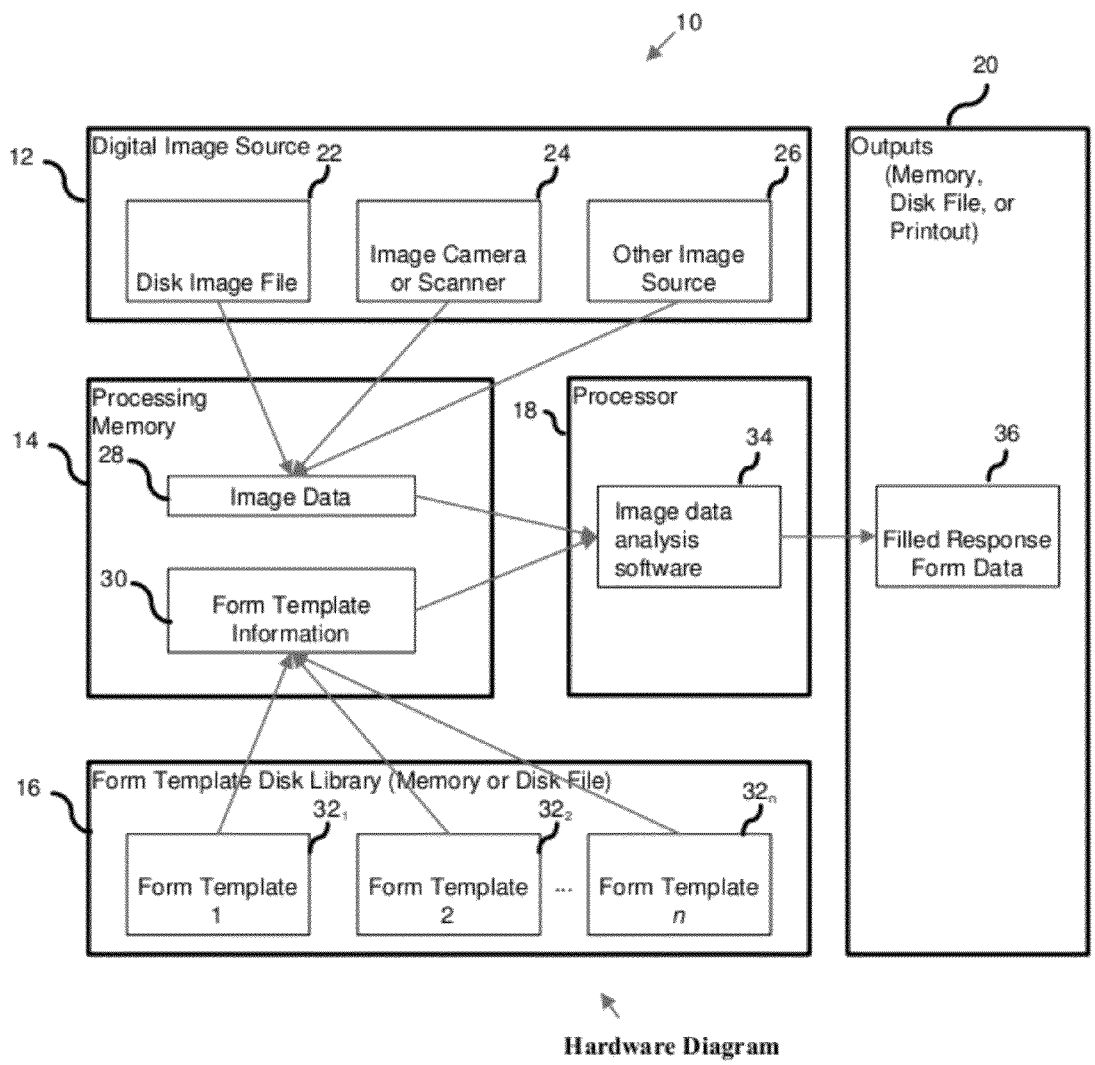
FIG. 11 shows a hardware schematic diagram in accordance with a preferred embodiment of the present invention.

FIG. 11 shows a hardware configuration 10 for this process. Digital image source 12 typically comes from one of several different possible sources, including a disk image file 22, an image scanner or camera 24, or other image sources 26. The image source 12 information is then sent into processing memory 14, wherein image data 28 is determined using the image source information. At the same time, information from form templates 32-1 through **32-*n* in form template disk library 16 is sent into form template information 30 in processing memory 14, where the response bubble and form element attribute information, the predetermined thresholds and the expected results are stored. The image data 28 and the form template information 30 are then passed into processor 18 where image data analysis software 34 determines the intended responses. The results are sent to filled response form data 36 in outputs 20**, which can include memory, disk files or a printout.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied (encoded) therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

While the present invention has been particularly shown and described with reference to one preferred embodiment thereof, it will be understood by those skilled in the art that various alterations in form and detail may be made therein without departing from the spirit and scope of the present invention.

What is claimed is:

1. A method of using at least one response bubble on a response form to indicate one or more responses, the response form having (i) an Optical Mark Recognition (OMR) key definition area that includes one or more response bubbles corresponding to one or more intended responses, and (ii) an OMR response area distinct from the OMR key definition area that includes one or more response bubbles for indicating intended responses, the method comprising:
   (a) completing the response form by:
      (i) defining an unambiguous symbology of one or more marks by completing the OMR key definition area, and
      (ii) filling in the OMR response area using the defined unambiguous symbology; and
   (b) electronically imaging the completed response form;
   (c) automatically interpreting the unambiguous symbology from the OMR key definition area that is completed on the response form; and
   (d) automatically determining the indicated intended responses of the one or more response bubbles of the completed response form using:
      (i) the interpreted unambiguous symbology, and
      (ii) the electronically imaged completed response form.

2. The method of claim 1 wherein steps (a)(i) and (a)(ii) are performed by the same person.

3. The method of claim 1 wherein the OMR key definition area is within the OMR response area.

4. The method of claim 1 wherein the unambiguous symbology of one or more marks is a set of different colors.

5. A method of using at least one response bubble on a response form to indicate one or more responses, the response form having (i) an Optical Mark Recognition (OMR) key definition area that includes one or more response bubbles corresponding to one or more intended responses, and (ii) an OMR response area distinct from the OMR key definition area that includes one or more response bubbles for indicating intended responses, the method comprising:
   (a) defining an unambiguous symbology of one or more marks in the OMR key definition area of the response form;
   (b) filling in the OMR response area of the response form using the defined unambiguous symbology;
   (c) electronically imaging the filled in response form including the OMR key definition area of the response form;
   (d) automatically interpreting the unambiguous symbology from the OMR key definition area of the response form that is electronically imaged in step (c); and
   (e) automatically determining the indicated intended responses of the one or more response bubbles of the filled in response form using:
      (i) the interpreted unambiguous symbology, and
      (ii) the electronically imaged filled in response form.

6. The method of claim 5 wherein the OMR key definition area is within the OMR response area.

7. A method of using at least one response bubble on a response form to indicate one or more responses, the response form having an Optical Mark Recognition (OMR) response area that includes one or more response bubbles for indicating intended responses, the method comprising:
   (a) completing the response form by filling in the OMR response area;
   (b) electronically imaging the completed response form;

(c) automatically inferring an unambiguous symbology of a plurality of different non-empty intended responses from the filled-in OMR response area; and
(d) automatically determining the indicated intended responses of the one or more response bubbles of the completed response form using:
  (i) the inferred unambiguous symbology, and
  (ii) the electronically imaged completed response form.

8. An automated method of processing responses on one or more response forms using (i) a batch header, and (ii) the one or more response forms, wherein the batch header has an Optical Mark Recognition (OMR) key definition area that includes one or more response bubbles corresponding to one or more intended responses, and wherein each of the response forms includes one or more response bubbles distinct from the OMR key definition area for indicating intended responses, the method comprising:
  (a) defining an unambiguous symbology of one or more marks by completing the OMR key definition area of the batch header;
  (b) completing the one or more response forms by filling in the one or more response bubbles of the one or more response forms using the defined unambiguous symbology;
  (c) electronically imaging the batch header and the one or more completed response forms;
  (d) automatically interpreting the unambiguous symbology from the OMR key definition area that is completed on the electronically imaged batch header; and
  (e) automatically determining the indicated intended responses of the one or more response bubbles on the one or more completed response forms using:
    (i) the interpreted unambiguous symbology, and
    (ii) the electronically imaged one or more completed response forms.

9. The method of claim 7 wherein the plurality of different non-empty intended responses includes erased marks and filled marks.

* * * * *